United States Patent
Christoph

(10) Patent No.: US 7,400,412 B2
(45) Date of Patent: Jul. 15, 2008

(54) CO-ORDINATE MEASURING INSTRUMENT

(75) Inventor: Ralf Christoph, Giessen (DE)

(73) Assignee: Werth Messtechnik GmbH, Giessen (DE)

( * ) Notice: Subject to any disclaimer, the term of this patent is extended or adjusted under 35 U.S.C. 154(b) by 374 days.

(21) Appl. No.: 10/548,264

(22) PCT Filed: Apr. 29, 2004

(86) PCT No.: PCT/EP2004/004509

§ 371 (c)(1), (2), (4) Date: Sep. 6, 2005

(87) PCT Pub. No.: WO2004/097336

PCT Pub. Date: Nov. 11, 2004

(65) Prior Publication Data
US 2006/0077402 A1    Apr. 13, 2006

(30) Foreign Application Priority Data
Apr. 30, 2003    (DE) .............................. 103 19 798

(51) Int. Cl.
*G01B 11/24* (2006.01)
*G01B 11/14* (2006.01)

(52) U.S. Cl. ................ 356/601; 356/614; 356/616
(58) Field of Classification Search .............. 355/53; 256/601, 616
See application file for complete search history.

(56) References Cited

U.S. PATENT DOCUMENTS

| | | | | |
|---|---|---|---|---|
| 3,383,538 A * | 5/1968 | Bowyer | | 313/93 |
| 3,543,384 A * | 12/1970 | Hansen | | 82/47 |
| 3,774,031 A * | 11/1973 | Mallard et al. | | 250/503.1 |
| 4,125,776 A * | 11/1978 | Tosswill et al. | | 378/149 |
| 4,767,935 A * | 8/1988 | Anderson et al. | | 250/559.04 |
| 5,099,134 A * | 3/1992 | Hase et al. | | 250/505.1 |
| 5,263,075 A * | 11/1993 | McGann et al. | | 378/147 |
| 5,459,592 A | 10/1995 | Shibatani et al. | | |
| 5,528,655 A * | 6/1996 | Umetani et al. | | 378/98.2 |
| 5,966,424 A * | 10/1999 | Liu | | 378/98.8 |
| 6,152,580 A * | 11/2000 | Babuka et al. | | 362/330 |
| 6,287,436 B1 * | 9/2001 | Pelletier et al. | | 204/298.11 |
| 6,353,227 B1 * | 3/2002 | Boxen | | 250/363.1 |
| 6,527,410 B2 * | 3/2003 | Yamaguchi | | 362/243 |
| 6,906,702 B1 * | 6/2005 | Tanaka et al. | | 345/175 |
| 6,963,409 B2 * | 11/2005 | Benner et al. | | 356/616 |

(Continued)

FOREIGN PATENT DOCUMENTS

DE    2701764    7/1978

(Continued)

*Primary Examiner*—L. G. Lauchman
*Assistant Examiner*—Jarreas C Underwood
(74) *Attorney, Agent, or Firm*—Dennison, Schultz & MacDonald

(57) ABSTRACT

A co-ordinate-measuring instrument is provided with a trans-lumination device which includes at least one illumination body and an image processing sensor system which is provided with a lens measuring along an optical axis. In order to perform high-accuracy measurement without the necessity of placing and removing the illumination body and the sensor image processing system, the illumination body is constructed in such a way that it emits diffused light and a filter which is embodied, for example in the form of a comb, provided with through holes and arranged between the illumination body and a measured object is transparent for beams forming with the axis an angle which is less than a defined limiting angle α.

17 Claims, 1 Drawing Sheet

U.S. PATENT DOCUMENTS

| | | |
|---|---|---|
| 6,975,409 B2 * | 12/2005 | Cemic et al. ............... 356/620 |
| 2001/0017674 A1 | 8/2001 | Yamaguchi |
| 2002/0001090 A1 | 1/2002 | Cemic et al. |
| 2004/0160777 A1 | 8/2004 | Cemic et al. |

FOREIGN PATENT DOCUMENTS

| | | |
|---|---|---|
| DE | 19805040 | 8/1999 |
| DE | 20205631 | 10/2002 |

* cited by examiner

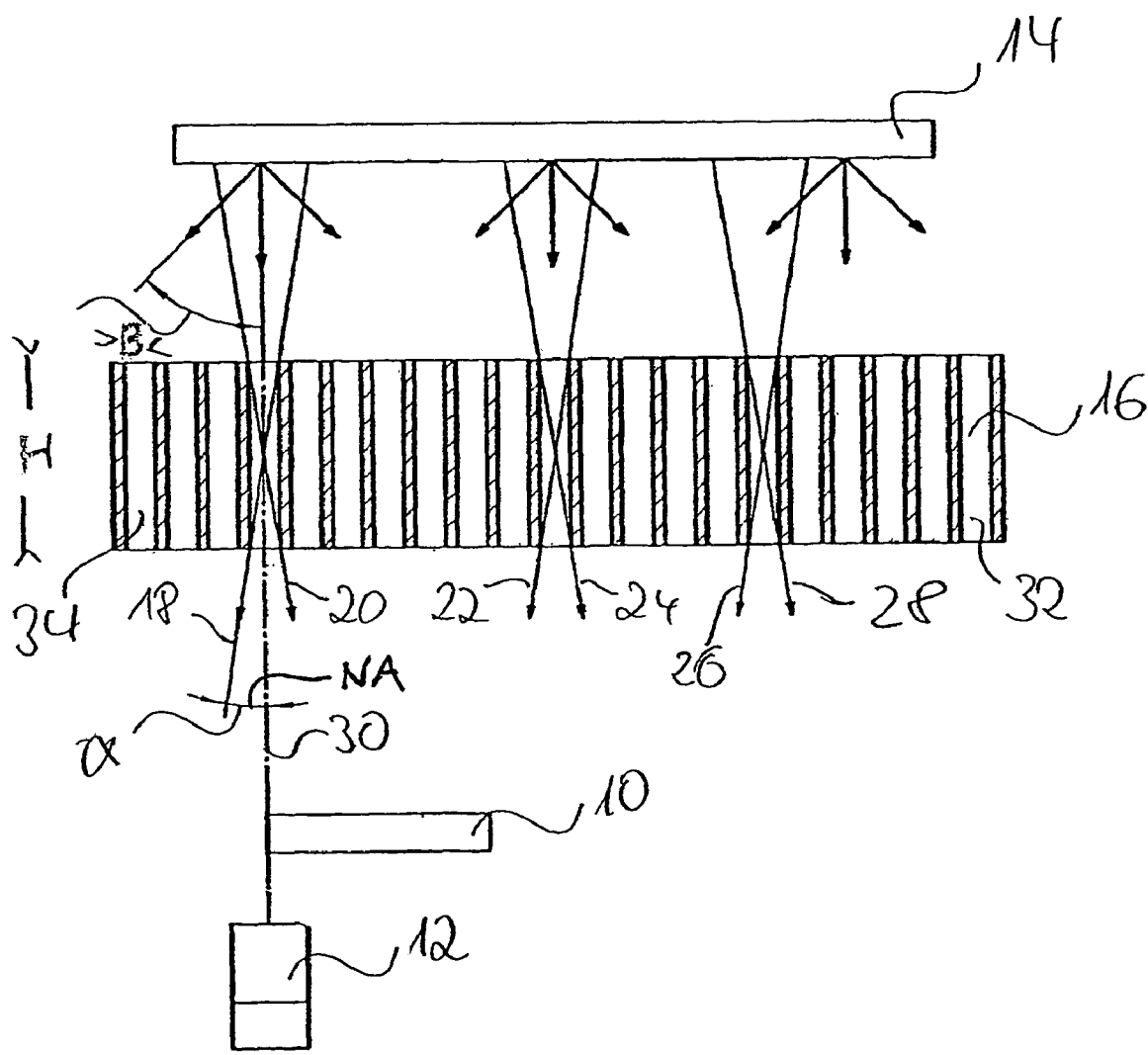

CO-ORDINATE MEASURING INSTRUMENT

This application is a filing under 35 USC 371 of PCT/EP2004/004509 filed Apr. 29, 2004.

BACKGROUND OF THE INVENTION

The invention relates to a coordinate measuring device with a backlighting arrangement, especially for measuring a large area object, including at least one illumination element as well as an image processing sensor unit comprising a lens measuring along an optical axis.

In order to measure large area objects with a coordinate measuring device comprising an image processing sensor, it is necessary to illuminate large areas with as parallel light as possible to obtain reproducible measuring results of high accuracy.

Here exists the possibility of positioning moving illumination units together with the camera. The mechanical components necessary for this are, however, expensive and reduce the dynamic quality of the overall measuring device due to the moved masses.

A light flow regulator for a microscope is known from DE-A 27 01 764, which has a support with a set of light-permeable channels running parallel to one another. The support is rotatable about an axis in order to allow light to penetrate through the channels to the desired extent.

A backlighting configuration for a coordinate measuring device can be inferred from DE-A 198 05 040. A measured object can be subjected to diffuse or directed light by arrangements of fiber light guides, fluorescent tubes and/or light diodes.

A water-tight illumination arrangement according to DE-U 202 05 631, which is determined for manufacturing apparatuses, has a large number of light diodes whose rays are guided by a honey-comb light guide.

SUMMARY OF THE INVENTION

The present invention is based upon the problem of refining a coordinate measuring device of the type mentioned at the beginning such that measurements can be conducted with high accuracy without requiring the joint positioning and moving of the illumination element and the image processing sensor unit.

The problem is basically solved in accordance with the invention in that the at least one illumination element is constructed such that it emits diffuse radiation and in that a filter with channel-like openings is arranged between the illumination element and the object, the openings extending parallel to the optical axis and allowing rays smaller than a defined limiting angle $\alpha$ in relation to the optical axis to pass through.

The invention is in particular defined by the fact that the channel-like openings have an aperture, which is equal to or smaller than the optical aperture of the lens. In this way, imaging errors and therewith measuring errors in the coordinate measuring device are avoided, especially when measuring rotation-symmetrical parts.

The limiting angle under which light can penetrate the openings basically comes to less than 10°, preferably less than 3°, if need be less than 1°.

The filter can, for example, have openings with a circular, polygonal or a rectangular or hexagonal cross-section, in particular a square cross-section, wherein the openings run in the direction of the optical axis. Here the openings may have a cylindrical shape with a rectangular or square or circular crosssection in a length to diameter or edge ratio that should be at least 4:1 to 10:1. In particular the length to diameter or edge ratio (aspect ratio limitation) is $50:1 \geq H:B \geq 2:1$.

The illumination aperture is selectively reduced in accordance with the invention by arranging the filter between the object and the illumination apparatus to use the illumination rays, which describe an angle between the optical axis smaller than a mechanically defined limiting angle, to illuminate the object to be measured. A sharper image is possible in this way, especially when measuring rotation-symmetrical parts.

According to the invention, a point light source is virtually generated for each place on the illumination surface. In this way, a large area radiator, for example in the form of a glass plate, can be used as an illumination element, into which light is laterally injected. A fluorescent tube, for example, can be used for this.

Stray light, which otherwise could reach the optics, i.e. the image sensor unit, is avoided by the theory of the invention. In this way, imaging errors and therewith measuring errors are avoided with the coordinate measuring device, especially when measuring rotation-symmetrical parts.

Consequently large areas, which are quasi illuminated with parallel rays, or rays which describe a very small angle in relation to the optical axis of the image processing sensor unit comprising a camera such as a CCD camera, can be measured with a static illumination arrangement.

Further particularities, advantages and features of the invention will become apparent not only on the basis of the claims, the features to be inferred from them-by themselves and/or in combination-but also on the basis of the description below of a preferred embodiment to be inferred from the drawing.

BRIEF DESCRIPTION OF THE DRAWING

The sole drawing figure is a schematic diagram of a coordinate measuring device for a large area object.

DESCRIPTION OF THE PREFERRED EMBODIMENTS

An arrangement for measuring especially a rotation-symmetrical or large area object 10 using a coordinate measuring device is represented purely in outline in the sole figure. In order to measure the object 10 using an image processing sensor unit 12 such as a camera, the object is irradiated using a illumination element 14 emitting diffuse radiation. This may be a glass plate into which light is injected through a side surface or edge. In order to illuminate the object 10 with as parallel light as possible, a filter 16 is arranged between the object 10 and the illumination body 14 on the optical axis 30 of the image processing sensor 12, the filter allowing illumination rays 18, 20, 22, 24, 26, 28 which are smaller than a mechanically defined limiting angle $\alpha$, which is useful for illuminating the object, to pass through. A sharper image is attainable in this way, especially when measuring rotation-symmetrical parts such as shafts, turned pieces, threads, tools, whereby the respective longitudinal axis of the rotation-symmetrical parts or elements should run transversely in relation to the optical axis.

The angle $\alpha$ is mechanically defined by the construction of the filter 16. For this purpose the filter 16 has a preferably honeycombed structure with passage perforations or apertures 32, 34, which have a defined ratio of the length L to the diameter D such that the angle of aperture is reduced after penetrating the filter 16. Consequently the object 10 to be measured is only illuminated with the illumination aperture defined by angle $\alpha$. Hence object 10 or image processing sensor unit 12 or camera can be moved in relation to one another behind the filter 16 in order to be able to record the object 10 with the image processing sensor unit 12 or the camera for metrological purposes without necessitating a movement of the illumination element 14. The interior surface of the openings 32, 34 is in this way constructed such that reflections, which can lead to an aperture enlargement, are ruled out. Thus the interior surface can be matted.

The openings can have any desired cross-section, especially a rectangular, such as a square cross-section, or can have a circular cross-section.

Preferably the angle is $\alpha \leq 10°$, especially $\alpha \leq 3°$, if need be $\leq 1°$. The length to diameter or edge ratio H:B should be at least in the range of 4:1 to 10:1. Preferably the aspect ratio is $50:1 \leq H:B \leq 2[:]1$, especially $H:B \geq 10$.

For example, the openings 32, 34 can have a length H of 20 mm and a diameter or edge length B with 1 mm or a length H of 6.5 mm and a diameter or an edge length of 1 mm, to name values only by way of example, which nonetheless do not represent a restriction of the theory of the invention.

In other words, the aperture (opening angle $\alpha$) of illumination is adapted to that of the lens, i.e. its optical aperture, used by the theory of the invention. In this way, the illumination aperture should be equal to or smaller than the lens aperture. Typical values for the lens aperture can range between 0.02 and 0.8 without restricting the theory of the invention in this way.

Quite generally the illumination aperture NA is set with the ratio between edge length or diameter B of the opening 32, 34 to its length according to the following correlation: $NA = \sin(\arctan(B/H))$.

A typical ratio of the previously indicated values of B=1 mm and H=20 mm yields an illumination aperture NA of 0.05. This corresponds to a lens aperture with a 0.2 times magnification. For a lens with 10 fold magnification, this results in an illumination aperture NA=0.5 so that, considering the previously mentioned correlation, this means B=1 mm and H=6.5 mm. These values are mentioned purely by way of example.

The invention claimed is:

1. Coordinate measuring device for measuring an object, comprising:
   an image processing sensor unit comprising a lens measuring along an optical axis; and
   coordinate measuring means; and
   a transmitted light means for illuminating the object, comprising at least one illumination element constructed and arranged to emit diffuse radiation, and a filter with channel-like openings arranged between the illumination element and the object, the openings extending parallel to the optical axis and allowing rays smaller than a defined angle $\alpha \leq 10°$ in relation to the optical axis to pass therethrough.

2. Coordinate measuring device according to claim 1, wherein the channel-like openings have an illumination aperture NA, which is equal to or smaller than an optical aperture of the lens.

3. Coordinate measuring device according to claim 2, wherein $\alpha \leq 3°$.

4. Coordinate measuring device according to claim 3, wherein $\alpha \leq 1°$.

5. Coordinate measuring device according to claim 2, wherein the illumination aperture NA is of a size $0.03 \leq NA \leq 0.18$.

6. Coordinate measuring device according to claim 5, wherein $0.05 \leq NA \leq 0.15$.

7. Coordinate measuring device according to claim 1, wherein the filter is a honeycombed element comprising the aperture.

8. Coordinate measuring device according to claim 7, wherein the honeycombed element is a ceramic.

9. Coordinate measuring device according to claim 1, wherein the openings have a cylindrical shape with a circular or rectangular cross-section, and have a length (H) to diameter or edge length (D) ratio of $50:1 \leq H:B \leq 2:1$.

10. Coordinate measuring device according to claim 9, wherein $H:B \geq 10$.

11. Coordinate measuring device according to claim 9, wherein the openings have a square cross-section.

12. Coordinate measuring device according to claim 1, wherein the illumination element is a large area radiator.

13. Coordinate measuring device according to claim 12, wherein the large area radiator is a glass plate into which light is injected laterally.

14. Coordinate measuring device according to claim 7, wherein the openings of the honeycombed element have a cross-section of a circle or a polygon.

15. Coordinate measuring device according to claim 1, wherein the openings have an aspect ratio of at least 4:1.

16. Coordinate measuring device according to claim 1, wherein the openings have an aspect ratio of at least 10:1.

17. Coordinate measuring device according to claim 1, wherein the openings are constructed in an anti-reflecting manner thereinside.

* * * * *